(No Model.) 2 Sheets—Sheet 1.

J. M. CHENEY.
Farm Gate.

No. 233,658. Patented Oct. 26, 1880.

Witnesses
Frank A. Brook
H. F. Dexter

Inventor
John M. Cheney
By Dewey & Co.
attys (No Model.) 2 Sheets—Sheet 2.

J. M CHENEY.
Farm Gate.

No. 233,658. Patented Oct. 26, 1880.

Witnesses;
J. Walter Fowler,
R. K. Evans

Inventor;
John M. Cheney
by Dewey & Co
Attys

UNITED STATES PATENT OFFICE.

JOHN M. CHENEY, OF SONOMA, CALIFORNIA.

FARM-GATE.

SPECIFICATION forming part of Letters Patent No. 233,658, dated October 26, 1880.

Application filed June 23, 1880. (No model.)

*To all whom it may concern:*

Be it known that I, JOHN M. CHENEY, of the town and county of Sonoma, and State of California, have invented an Improved Farm-Gate; and I hereby declare the following to be a full, clear, and exact description thereof.

My invention relates to certain improvements in that class of farm-gates which are constructed in such a manner that they may be opened and closed without the need of the driver of a team desiring to pass leaving his wagon to move the gate.

My improvements consist in a peculiar combination of cords or chains and rollers applied to a gate suspended on rollers and moving in a horizontal plane, said cords and rollers being adapted to be moved by cranks from either side of the gate, whereby the gate is readily and smoothly opened and closed, as is more fully described in the accompanying drawings, in which—

Figure 1:
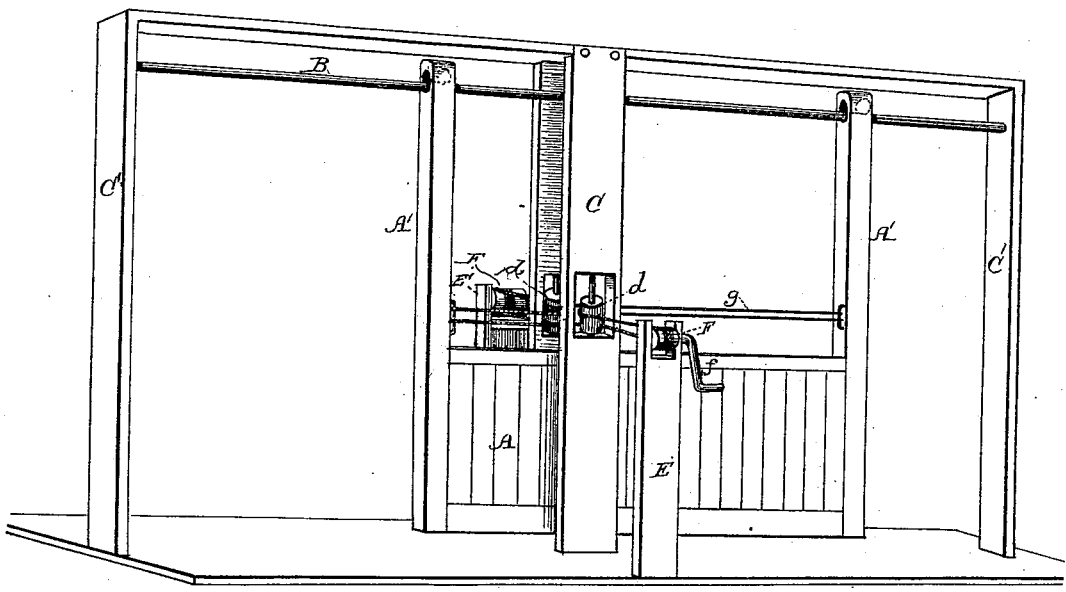
Figure 2:
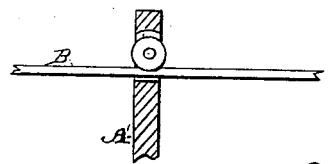
Figure 3:
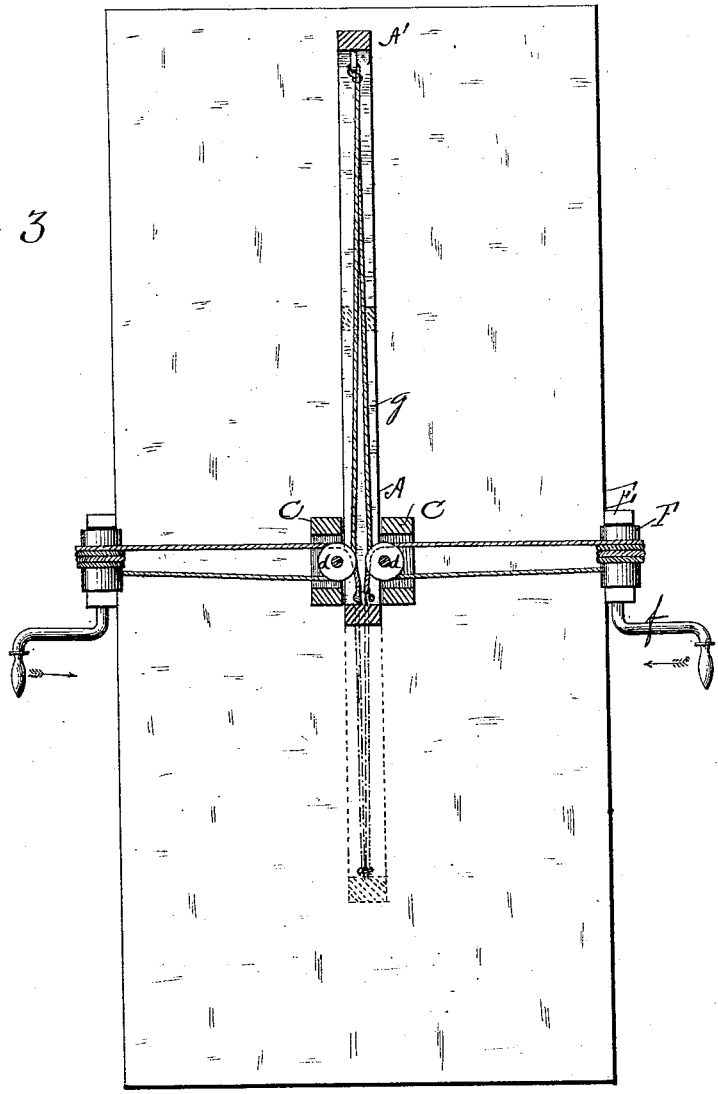

Figure 1 is a view of my device. Fig. 2 is a detail of construction. Fig. 3 is a view, partially in plan and partially in horizontal section, showing the operating mechanism of the gate.

The gate A is suspended by its end frames, A', on pulleys, which move on a transverse brace, B, supported on standards C C'. The center standard, C, is double, as shown, the gate moving between the two parts. In each of these center standards is placed a grooved roller or sheave, $d$, adapted to rotate in a horizontal plane, one of these rollers being on each side of the gate.

A post, E E', is placed on the side of the road on each side of the gate, and on this post is a roller, F, provided with a crank, $f$. Around each roller F passes a chain or cord, $g$, the ends of which are carried around the roller or sheave $d$, crossing inside this roller and being secured to opposite ends of the gate, as shown.

Each roller on each side of the gate has its independent cord or chain operated in precisely the same manner, in order that the gate may be moved in either direction. Each chain or cord has one end fastened to one end of the gate, thence passed around the sheave $d$, thence around the roller F, back around the sheave $d$, and is then passed to the other end of the gate, where the other end of the cord is secured. There are therefore no loose ends of rope or chain, and the whole is compact and neat.

This gate moves horizontally, and, being suspended, as shown, moves smoothly, with no danger of dragging or catching.

On coming to the gate the driver, without leaving his seat, operates the crank, which rolls the chain, drawing the gate back. After passing through and clearing the gate with the wagon he operates the other crank, and by the same means closes the gate again.

Having thus described my invention, what I claim as new, and desire to secure by Letters Patent, is—

The gate A, provided with the end frames, A' A', and horizontal supporting-bar B, in combination with the vertically-placed rollers $d\ d$, horizontally-placed rollers F F, provided with cranks $f$, pulley-supports C and E, and cords $g\ g$, each cord having an end fastened to an end frame, A', and thence passing over one of the rollers $d$, around roller F, and back around roller $d$, in the opposite direction, and the other end secured to the opposite end frame, A', all constructed, arranged, and operated as set forth.

In witness whereof I have hereunto set my hand.

JOHN M. CHENEY.

Witnesses:
T. H. CHENEY,
CHAS. G. YALE.